US012615375B2

(12) United States Patent
Kuo et al.

(10) Patent No.: US 12,615,375 B2
(45) Date of Patent: \*Apr. 28, 2026

(54) CHROMA CODING ENHANCEMENT IN CROSS-COMPONENT CORRELATION

(71) Applicant: BEIJING DAJIA INTERNET INFORMATION TECHNOLOGY CO., LTD., Beijing (CN)

(72) Inventors: Che-Wei Kuo, San Diego, CA (US); Xiaoyu Xiu, San Diego, CA (US); Wei Chen, San Diego, CA (US); Xianglin Wang, San Diego, CA (US); Yi-Wen Chen, San Diego, CA (US); Tsung-Chuan Ma, San Diego, CA (US); Hong-Jheng Jhu, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/821,000

(22) Filed: Aug. 30, 2024

(65) Prior Publication Data

US 2024/0430439 A1     Dec. 26, 2024

Related U.S. Application Data

(63) Continuation of application No. 17/530,292, filed on Nov. 18, 2021, now Pat. No. 12,108,049, which is a
(Continued)

(51) Int. Cl.
*H04N 19/14* (2014.01)
*H04N 19/132* (2014.01)
(Continued)

(52) U.S. Cl.
CPC ........... *H04N 19/14* (2014.11); *H04N 19/132* (2014.11); *H04N 19/186* (2014.11); *H04N 19/86* (2014.11)

(58) Field of Classification Search
CPC .... H04N 19/14; H04N 19/132; H04N 19/186; H04N 19/86
(Continued)

(56) References Cited

U.S. PATENT DOCUMENTS

2014/0192860 A1     7/2014   Onno et al.
2014/0348222 A1     11/2014  Hsiang et al.
(Continued)

FOREIGN PATENT DOCUMENTS

CN     100999290 A     7/2007
CN     103370936 A     10/2013
(Continued)

OTHER PUBLICATIONS

Y. He, CE5: report of CES-1.4 and CES-3.2 on Joint chroma cross-component adaptive loop filtering, Joint Video Experts Team (NET) ofITU-T SG 16 WP 3 and ISO/IEC JTC 1/SC 29/WG 11, Document: NET-Q0229-v2, 17th Meeting: Brussels, BE, Jan. 7-17, 2020, 8 pgs.
(Continued)

*Primary Examiner* — Nguyen T Truong
(74) *Attorney, Agent, or Firm* — Scully, Scott, Murphy & Presser, P.C.

(57) ABSTRACT

An electronic apparatus performs a method of decoding video data. The method includes: receiving the video signal that includes a first component and a second component; receiving a plurality of offsets associated with the second component; utilizing a characteristic measurement of the first component to obtain a classification category associated with the second component; selecting an offset from the
(Continued)

plurality of offsets for the second component according to the classification category; and modifying the second component based on the selected offset. The first component can be a luma video component and the second component can be a chroma video component.

20 Claims, 12 Drawing Sheets

Related U.S. Application Data continuation of application No. PCT/US2021/035727, filed on Jun. 3, 2021.

(60) Provisional application No. 63/033,836, filed on Jun. 3, 2020.

(51) Int. Cl.
  H04N 19/186 (2014.01)
  H04N 19/86 (2014.01)

(58) Field of Classification Search
  USPC ................................................... 375/240.02
  See application file for complete search history.

(56) References Cited

U.S. PATENT DOCUMENTS

| | | | | |
|---|---|---|---|---|
| 2015/0016542 A1* | 1/2015 | Rosewarne | .......... | H04N 19/126 |
| | | | | 375/240.25 |
| 2015/0071345 A1 | 3/2015 | Tourapis et al. | | |
| 2015/0117528 A1 | 4/2015 | Kim et al. | | |
| 2015/0281687 A1 | 10/2015 | Yasugi et al. | | |
| 2018/0063527 A1 | 3/2018 | Chen et al. | | |
| 2018/0205946 A1 | 7/2018 | Zhang et al. | | |
| 2018/0359480 A1 | 12/2018 | Xiu et al. | | |
| 2019/0124330 A1 | 4/2019 | Chien et al. | | |
| 2019/0297350 A1 | 9/2019 | Lin et al. | | |
| 2019/0306516 A1 | 10/2019 | Misra et al. | | |

FOREIGN PATENT DOCUMENTS

| | | | |
|---|---|---|---|
| CN | 103959776 A | 7/2014 |
| CN | 105306944 A | 2/2016 |
| CN | 106664425 A | 5/2017 |
| CN | 106717004 A | 5/2017 |
| CN | 109327704 A | 2/2019 |
| CN | 109479133 A | 3/2019 |
| CN | 109691102 A | 4/2019 |
| CN | 110677674 A | 1/2020 |
| CN | 110839153 A | 2/2020 |
| CN | 110881124 A | 3/2020 |
| CN | 110881126 A | 3/2020 |
| CN | 110896478 A | 3/2020 |
| CN | 110944198 A | 3/2020 |
| EP | 2728865 A2 | 5/2014 |
| JP | 2016226022 A | 12/2016 |
| KR | 20190023294 A | 3/2019 |
| WO | 2014047776 A1 | 4/2014 |
| WO | 2019135636 A1 | 7/2019 |
| WO | 2020002117 A2 | 1/2020 |
| WO | 2020053804 A1 | 3/2020 |

OTHER PUBLICATIONS

Yukinobu Yasugi, CBS-related: Clipping of intermediate value in CC-ALF, Joint Video Experts Team (JVET) ofITU-T SG 16 WP 3 and ISO/IEC JTC 1/SC 29/WG 11, Document: NET-P0290, 16th Meeting: Geneva, CH, Oct. 1-11, 2019, 4 pgs.

Beijing Dajia Internet Information Technology Co. Ltd., CN202180003309.4, Notification of Grant Patent Right, I Oct. 9, 2022, 5 pgs.

Beijing Dajia Internet Information Technology Co. Ltd. et al., International Search Report and Written Opinion, PCT/US2021/035727, Sep. 24, 2021, 11 pgs.

Benjamin Bross et al., Versatile Video Coding (Draft 9), NET-R2001-vA, Joint Video Experts Team (NET) ofITU-T SG 16 WP 3 and ISO/IEC JTC IS/C 29/WG 11 18th Meeting: by teleconference, Apr. 15-24, 2020, downloaded from <URL: https://www.jvet-experts.org/doc_end_user/current_document.php?id=10I55>, 538 pgs.

Kiran Misra et al., "Cross-Component Adaptive Loop Filter for Chroma," JVET-O0636_rl, Joint Video Experts Team (NET) ofITU-T SG 16 WP 3 and ISO/IEC JTC 1/SC 29/WG 11, 15th Meeting: Gothenburg, SE, Jul. 3-12, 2019, downloaded from: <URL: https://www.jvet-experts.org/doc_end_user/current_document.php?id=7252>, 9 pgs.

Jacob Strom et al., "Combined bilateral/SAO loop filter," NET-O0548, Joint Video Experts Team (JVET) ofITU-T SG 16 WP 3 and ISO/IEC JTC 1/SC 29 WG 11, 15th Meeting: Gothenburg, SE, Jul. 3-12, 2019, downloaded from: <URL: https://www.jvet_experts.org/doc_end_user/current_document.php?id=7I60>, 7 pgs.

Office Action dated Feb. 1, 2024 received in U.S. Appl. No. 17/530,292.

Notice of Allowance dated Jun. 3, 2024 received in U.S. Appl. No. 17/530,292.

First Office Action dated Jul. 4, 2025 received in Chinese Patent Application No. 202211276979.6.

First Office Action dated Mar. 24, 2025 received in Chinese Patent Application No. 202211484526.2.

* cited by examiner

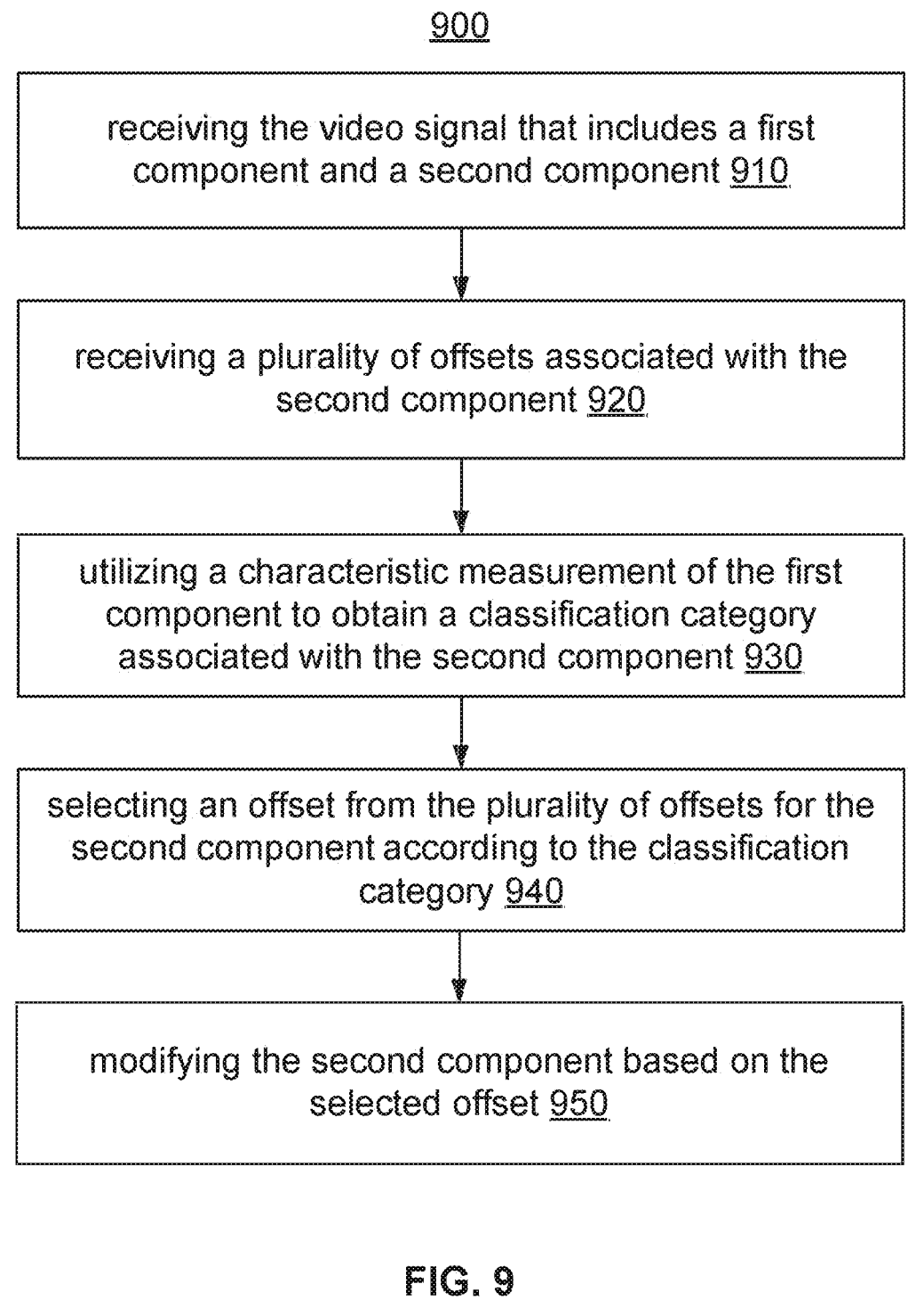

900

```
┌─────────────────────────────────────────────────┐
│   receiving the video signal that includes a first │
│   component and a second component 910            │
└─────────────────────────────────────────────────┘
                        │
                        ▼
┌─────────────────────────────────────────────────┐
│   receiving a plurality of offsets associated with the │
│   second component 920                            │
└─────────────────────────────────────────────────┘
                        │
                        ▼
┌─────────────────────────────────────────────────┐
│   utilizing a characteristic measurement of the first │
│   component to obtain a classification category   │
│   associated with the second component 930        │
└─────────────────────────────────────────────────┘
                        │
                        ▼
┌─────────────────────────────────────────────────┐
│   selecting an offset from the plurality of offsets for the │
│   second component according to the classification │
│   category 940                                    │
└─────────────────────────────────────────────────┘
                        │
                        ▼
┌─────────────────────────────────────────────────┐
│   modifying the second component based on the     │
│   selected offset 950                             │
└─────────────────────────────────────────────────┘
```

FIG. 9

CHROMA CODING ENHANCEMENT IN CROSS-COMPONENT CORRELATION

CROSS-REFERENCE TO RELATED APPLICATIONS

The present application is a continuation of U.S. application Ser. No. 17/530,292 filed Nov. 18, 2021, which is a continuation of International Application No. PCT/US2021/035727 filed Jun. 3, 2021, which claims priority to U.S. Provisional Patent Application No. 63/033,836 filed Jun. 3, 2020, the entire contents of each of which are incorporated herein by reference.

TECHNICAL FIELD

The present application generally relates to video coding and compression, and more specifically, to methods and apparatus on improving the chroma coding efficiency.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards. Some well-known video coding standards include Versatile Video Coding (VVC), High Efficiency Video Coding (HEVC, also known as H.265 or MPEG-H Part 2) and Advanced Video Coding (AVC, also known as H.264 or MPEG-4 Part 10), which are jointly developed by ISO/IEC MPEG and ITU-T VCEG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and apparatus on improving the coding efficiency of chroma coding, including improving the coding efficiency by exploring cross-component relationship between luma and chroma components.

According to a first aspect of the present application, a method of decoding video signal comprises: receiving the video signal that includes a first component and a second component; receiving a plurality of offsets associated with the second component; utilizing a characteristic measurement of the first component to obtain a classification category associated with the second component; selecting an offset from the plurality of offsets for the second component according to the classification category; and modifying the second component based on the selected offset. In some embodiments, the first component is a luma video component and the second component is a chroma video component.

According to a second aspect of the present application, an electronic apparatus includes one or more processing units, memory and a plurality of programs stored in the memory. The programs, when executed by the one or more processing units, cause the electronic apparatus to perform the method of coding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of coding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 9 is a flowchart illustrating an exemplary process of decoding video signal using Cross-component Correlation in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC, which provides approximately 30% bit-rate savings over the HEVC standard. In March 2019, at the 68-th AVS meeting, the AVS3-P2 baseline was finished, which provides approximately 30% bit-rate savings over the HEVC standard. Currently, one reference software, called high performance model (HPM), is maintained by the AVS group to demonstrate a reference implementation of the AVS3 standard. Like the HEVC, the AVS3 standard is built upon the block-based hybrid video coding framework.

Figure 1:
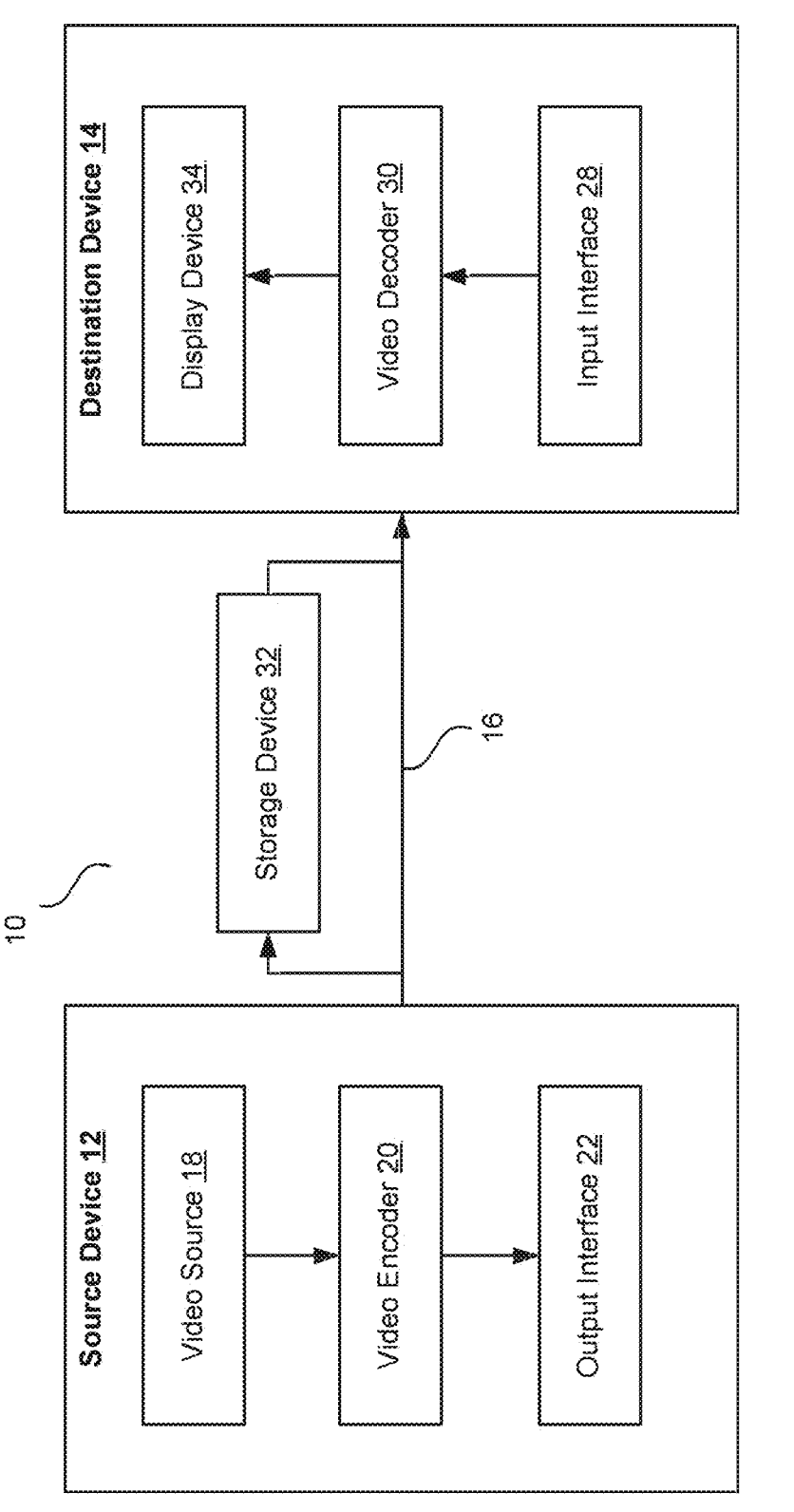
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), AVS, or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
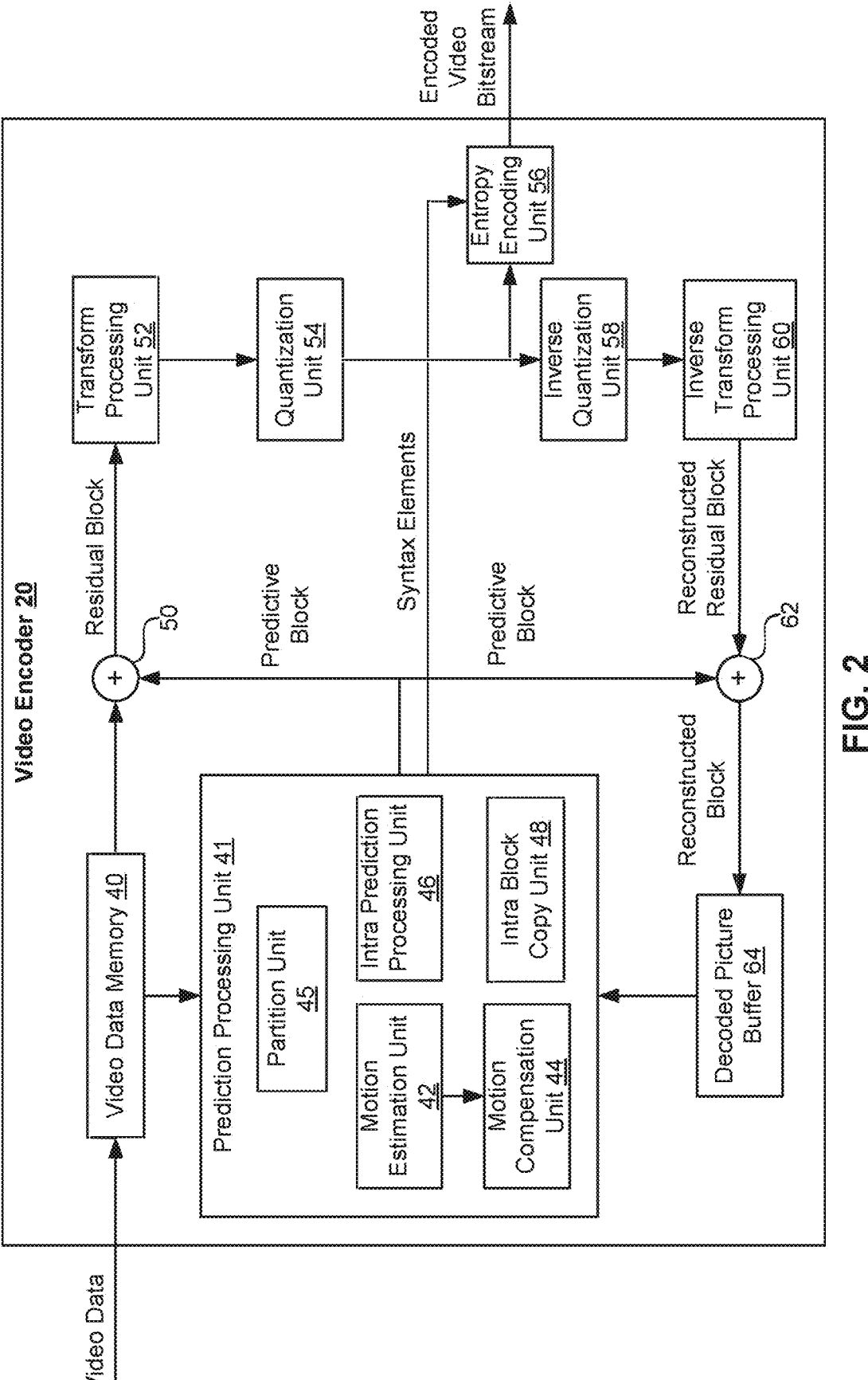
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. An in-loop filter, such as a deblocking filter (not shown) may be positioned between summer 62 and DPB 64 to filter block boundaries to remove blockiness artifacts from reconstructed video. Another in-loop filter (not shown) may also be used in addition to the deblocking filter to filter the output of summer 62. Further in-loop filtering, such as sample adaptive offset (SAO) and adaptive in-loop filter (ALF) may be applied on the reconstructed CU before it is put in the reference picture store and used as reference to code future video blocks. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles).

Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
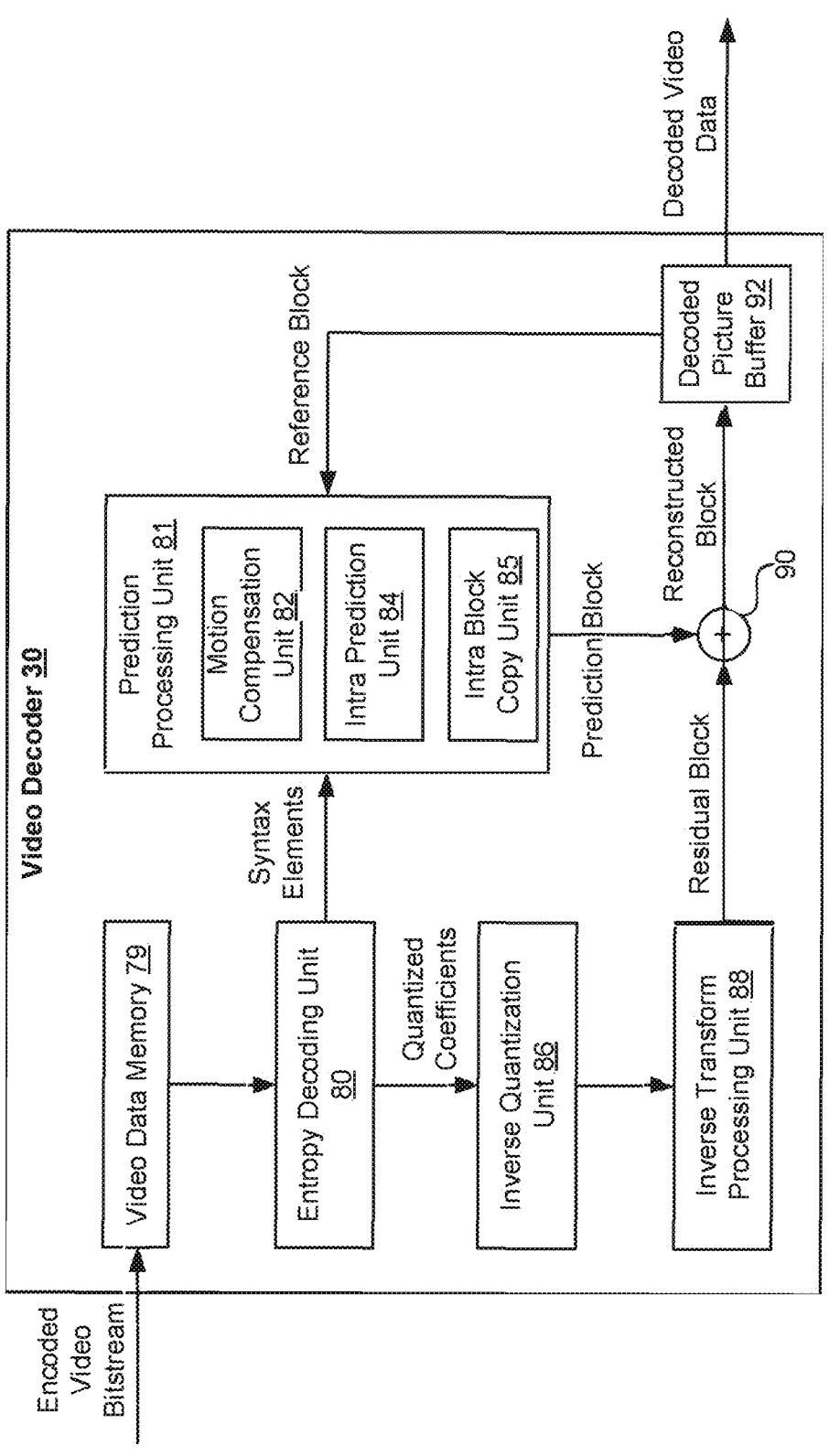
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The in-loop filtering, such as deblocking filter, sample adaptive offset (SAO) and adaptive in-loop filter (ALF) may be applied on the reconstructed CU before it is put in the reference picture store. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Like the HEVC, the AVS3 standard is built upon the block-based hybrid video coding framework. The input video signal is processed block by block (called coding units (CUs)). Different from the HEVC which partitions blocks only based on quad-trees, in the AVS3, one coding tree unit (CTU) is split into CUs to adapt to varying local characteristics based on quad/binary/extended-quad-tree. Additionally, the concept of multiple partition unit type in the HEVC is removed, i.e., the separation of CU, prediction unit (PU) and transform unit (TU) does not exist in the AVS3. Instead, each CU is always used as the basic unit for both prediction and transform without further partitions. In the tree partition structure of the AVS3, one CTU is firstly partitioned based on a quad-tree structure. Then, each quad-tree leaf node can be further partitioned based on a binary and extended-quad-tree structure.

Figure 4A:
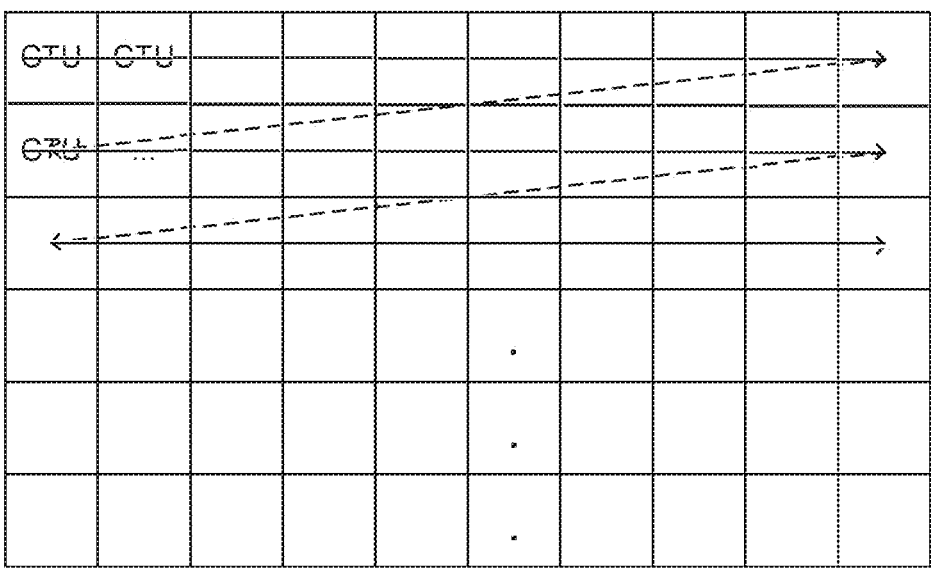
FIGS. 4A through 4E are block diagrams illustrating how a frame is recursively partitioned into multiple video blocks of different sizes and shapes in accordance with some implementations of the present disclosure.
Figure 4B:
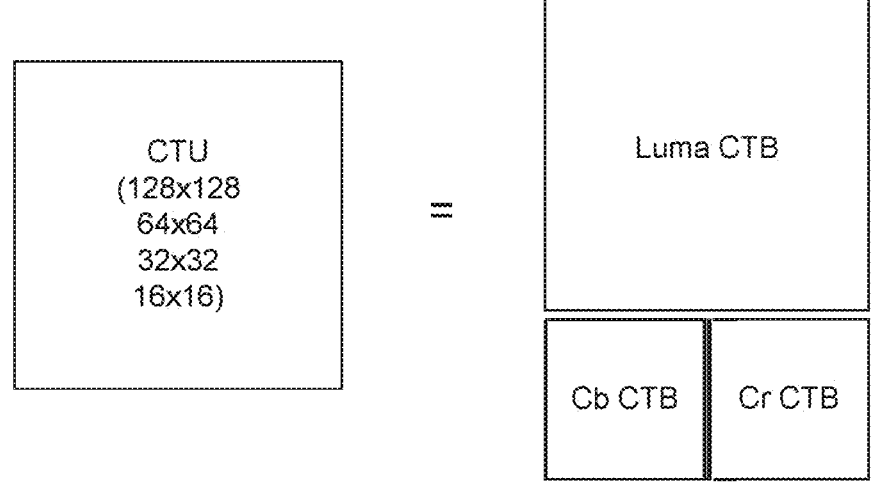

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
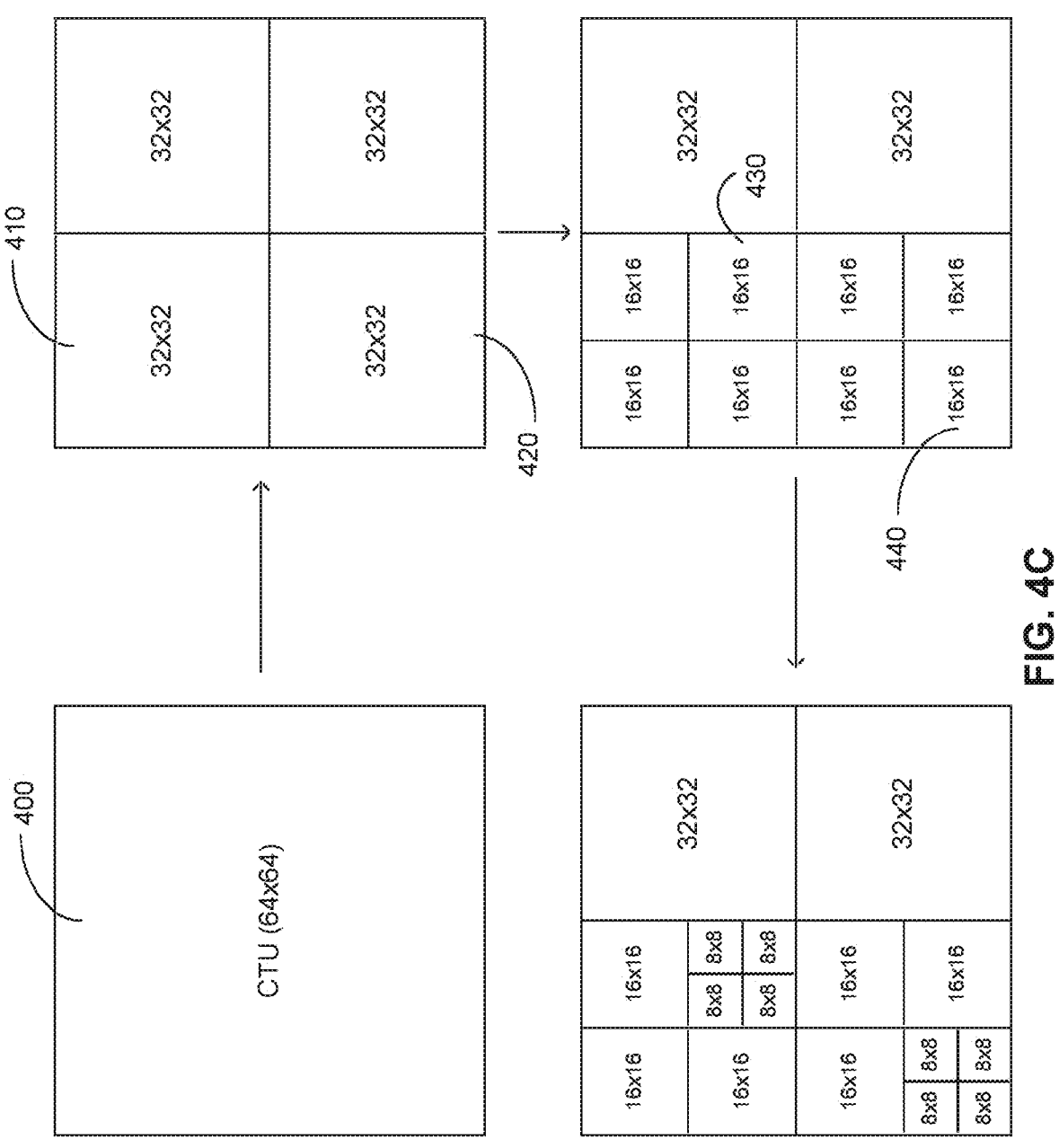
Figure 4D:
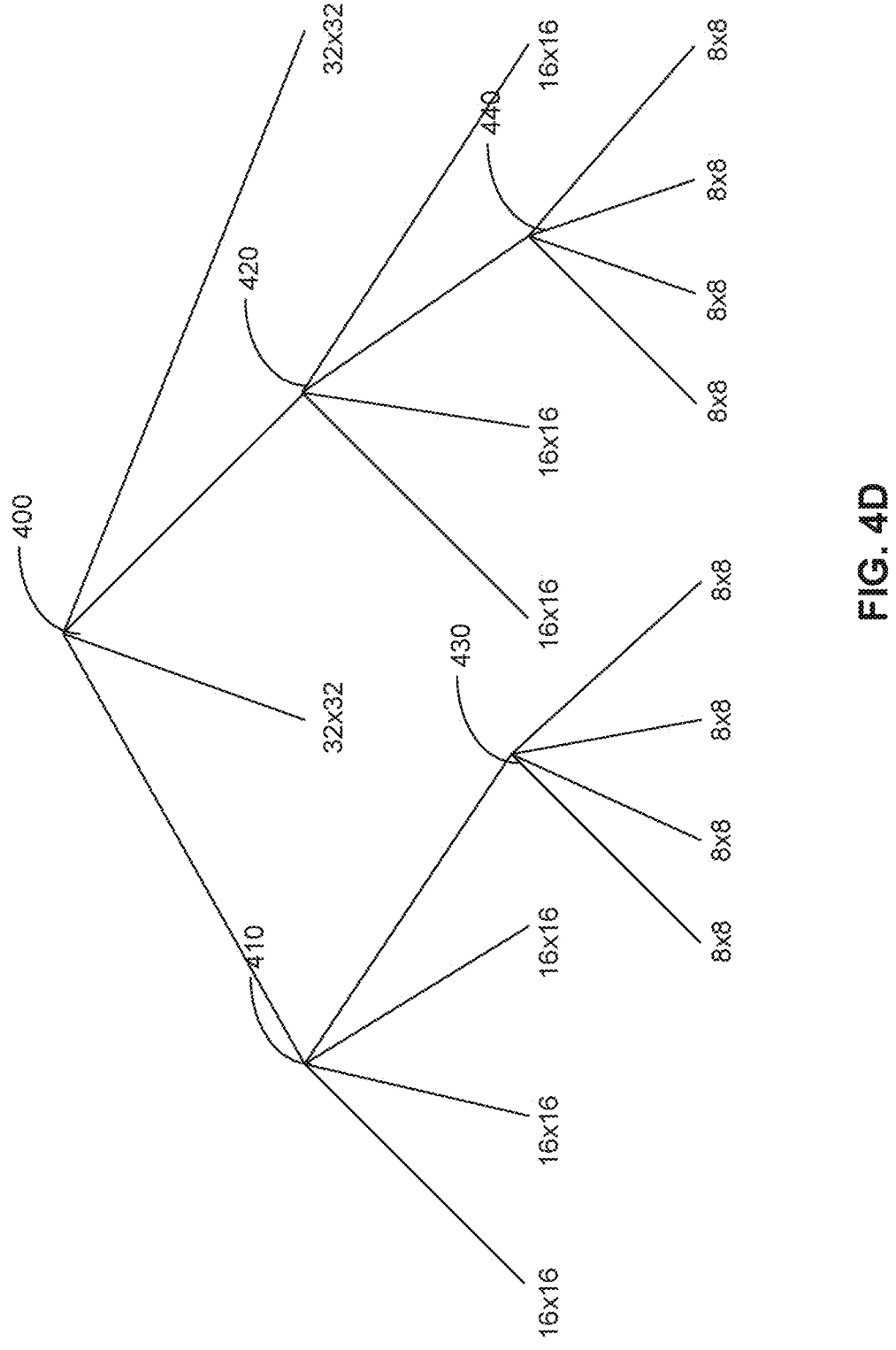
Figure 4E:
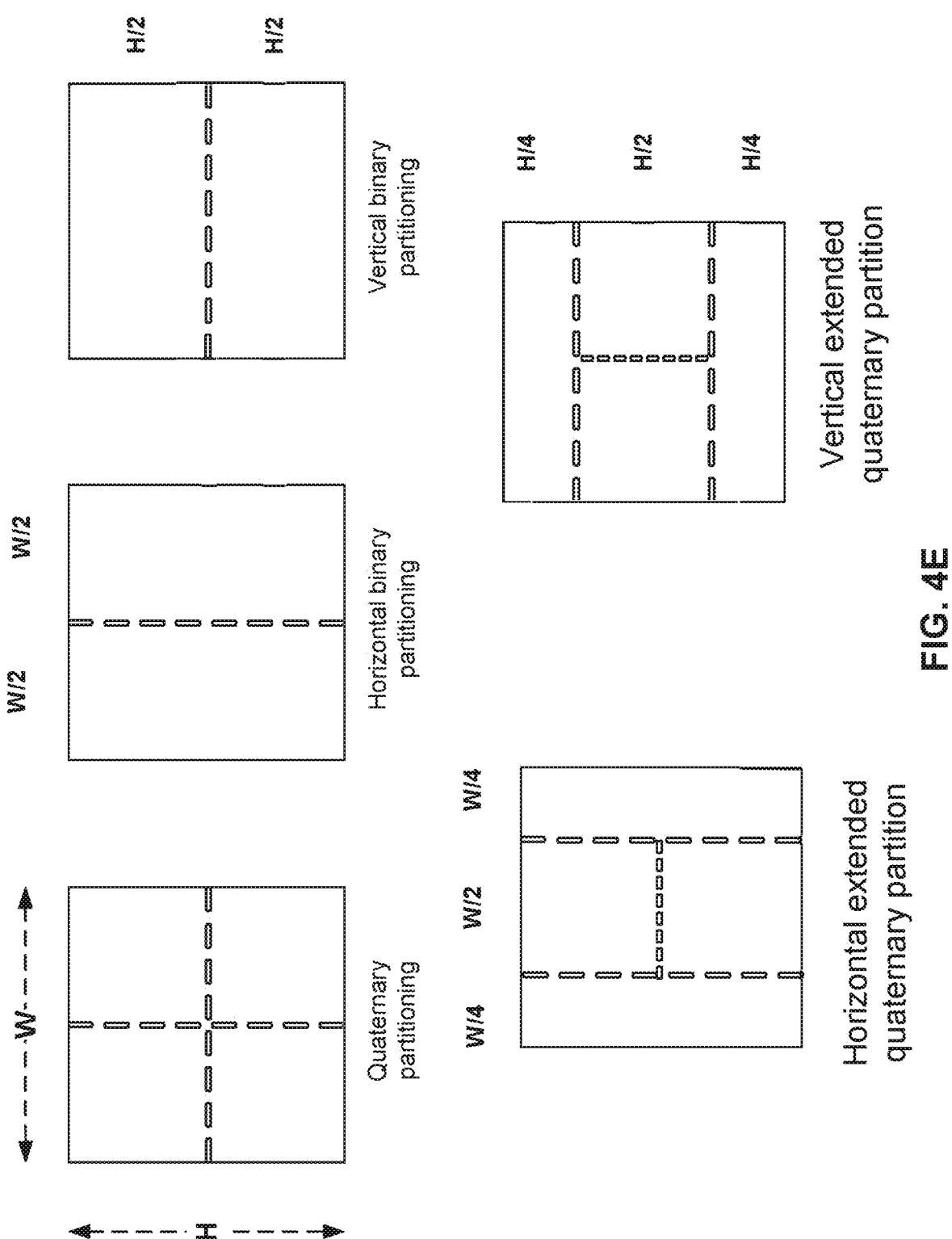

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five splitting/partitioning types in the AVS3, i.e., quaternary partitioning, horizontal binary partitioning, vertical binary partitioning, horizontal extended quaternary partitioning, and vertical extended quaternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

SAO is a process that modifies the decoded samples by conditionally adding an offset value to each sample after the application of the deblocking filter, based on values in look-up tables transmitted by the encoder. SAO filtering is performed on a region basis, based on a filtering type selected per CTB by a syntax element sao-type-idx. A value of 0 for sao-type-idx indicates that the SAO filter is not applied to the CTB, and the values 1 and 2 signal the use of the band offset and edge offset filtering types, respectively. In the band offset mode specified by sao-type-idx equal to 1, the selected offset value directly depends on the sample amplitude. In this mode, the full sample amplitude range is uniformly split into 32 segments called bands, and the sample values belonging to four of these bands (which are consecutive within the 32 bands) are modified by adding transmitted values denoted as band offsets, which can be positive or negative. The main reason for using four consecutive bands is that in the smooth areas where banding artifacts can appear, the sample amplitudes in a CTB tend to be concentrated in only few of the bands. In addition, the design choice of using four offsets is unified with the edge offset mode of operation which also uses four offset values. In the edge offset mode specified by sao-type-idx equal to 2, a syntax element sao-eo-class with values from 0 to 3 signals whether a horizontal, vertical or one of two diagonal gradient directions is used for the edge offset classification in the CTB.

Figure 5:
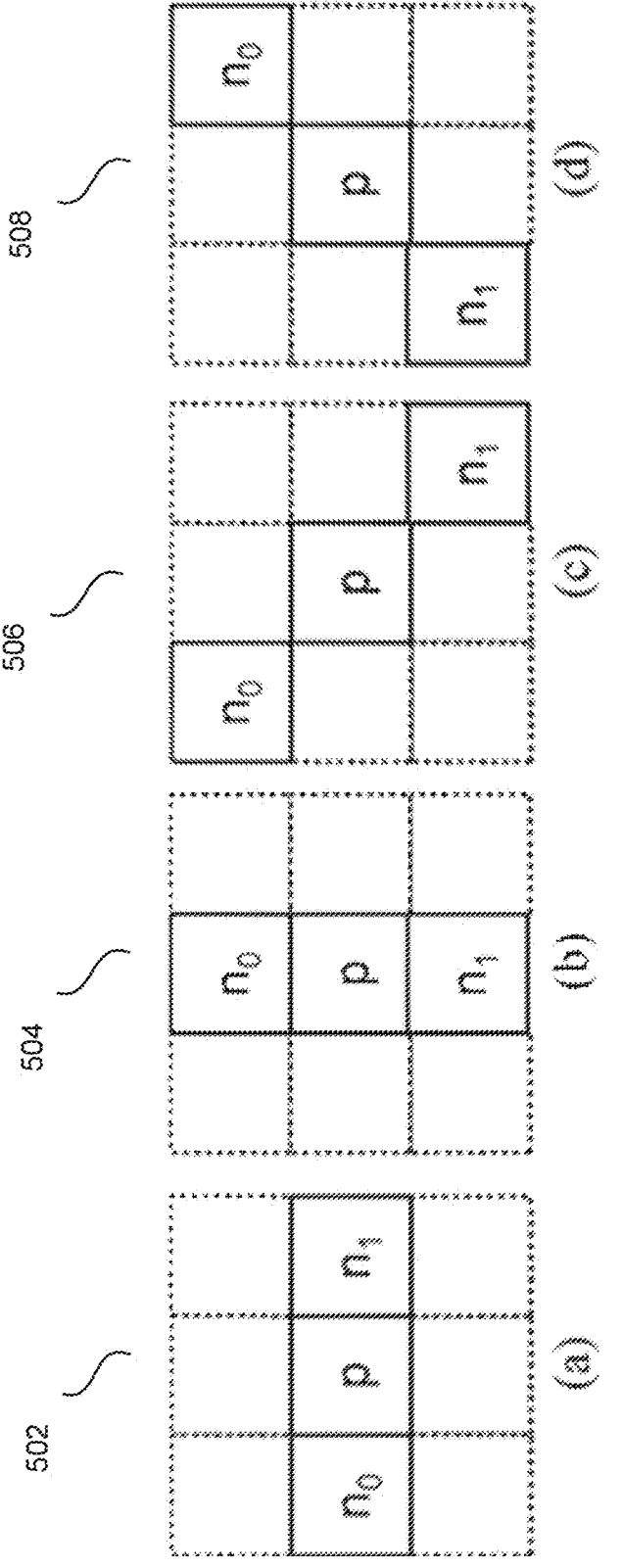
FIG. 5 is a block diagram depicting the four gradient patterns used in Sample Adaptive Offset (SAO) in accordance with some implementations of the present disclosure.

FIG. 5 is a block diagram depicting the four gradient patterns used in SAO in accordance with some implementations of the present disclosure. The four gradient patterns 502, 504, 506, and 508 are for the respective sao-eo-class in the edge offset mode. Sample labelled "p" indicates a center sample to be considered. Two samples labeled "n0" and "n1" specify two neighboring samples along the (a) horizontal (sao-eo-class=0), (b) vertical

TABLE 1

A sample EdgeIdx categories in SAO edge classes.

| EdgeIdx | Condition | Meaning |
|---------|-----------|---------|
| 0 | Cases not listed below | Monotonic area |
| 1 | $p < n_0$ and $p < n_1$ | Local min |
| 2 | $p < n_0$ and $p = n_1$ or $p < n_1$ and $p = n_0$ | Edge |
| 3 | $p > n_0$ and $p = n_1$ or $p > n_1$ and $p = n_0$ | Edge |
| 4 | $p > n_0$ and $p > n_1$ | Local max |

(sao-eo-class=1), (c) 135° diagonal (sao-eo-class=2), and (d) 45 diagonal (sao-eo-class=3) gradient patterns. Each sample in the CTB is classified into one of five EdgeIdx categories by comparing the sample value p located at some position with the values n0 and n1 of two samples located at neighboring positions as shown in FIG. 5. This classification is done for each sample based on decoded sample values, so no additional signaling is required for the EdgeIdx classification. Depending on the EdgeIdx category at the sample position, for EdgeIdx categories from 1 to 4, an offset value from a transmitted look-up table is added to the sample value. The offset values are always positive for categories 1 and 2 and negative for categories 3 and 4. Thus the filter generally has a smoothing effect in the edge offset mode. Table 1 below illustrates a sample EdgeIdx categories in SAO edge classes.

Table 1: A sample EdgeIdx categories in SAO edge classes.

For SAO types 1 and 2, a total of four amplitude offset values are transmitted to the decoder for each CTB. For type 1, the sign is also encoded. The offset values and related syntax elements such as sao-type-idx and sao-eo-class are determined by the encoder-typically using criteria that optimize rate-distortion performance. The SAO parameters can be indicated to be inherited from the left or above CTB using a merge flag to make the signaling efficient. In summary, SAO is a nonlinear filtering operation which allows additional refinement of the reconstructed signal, and it can enhance the signal representation in both smooth areas and around edges.

In some embodiments, methods and systems are disclosed herein to improve the coding efficiency or reduce the complexity of Sample Adaptive Offset (SAO) by introducing cross-component information. SAO is used in the HEVC, VVC, AVS2 and AVS3 standards. Although the existing SAO design in the HEVC or VVC standards is used as the basic SAO method in the following descriptions, to a person skilled in the art of video coding, the methods described in the disclosure can also be applied to other loop filter designs or other coding tools with the same or similar design spirits, for example, Constrained Directional Enhancement Filter (CDEF) in the AV1 standard.

For the existing SAO design in the HEVC, VVC, AVS2 or AVS3 standards, the luma Y, chroma Cb and chroma Cr sample offset values are decided independently. That is, for example, the current chroma sample offset is decided by only neighbouring chroma sample values, without taking collocated or neighbouring luma samples into consideration. However, because luma samples preserve more original picture detail information than chroma samples, they can benefit the decision of the current chroma sample offset. Furthermore, chroma samples usually lost high frequency details after color conversion from RGB to YCbCr, or after deblocking filter. So introducing luma samples with high frequency detail preserved for chroma offset decision can benefit the chroma sample reconstruction. Hence, further gain can be expected by exploring cross-component correlation for SAO, for example, by using the methods and systems of Cross-Component Sample Adaptive Offset (CCSAO).

Figure 6:
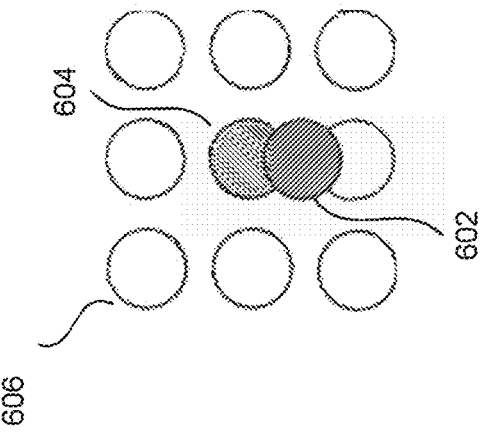
FIG. 6 is a block diagram illustrating the system and process of Cross-Component Sample Adaptive Offset (CCSAO) according to some implementations of the present disclosure.
Figure 6:
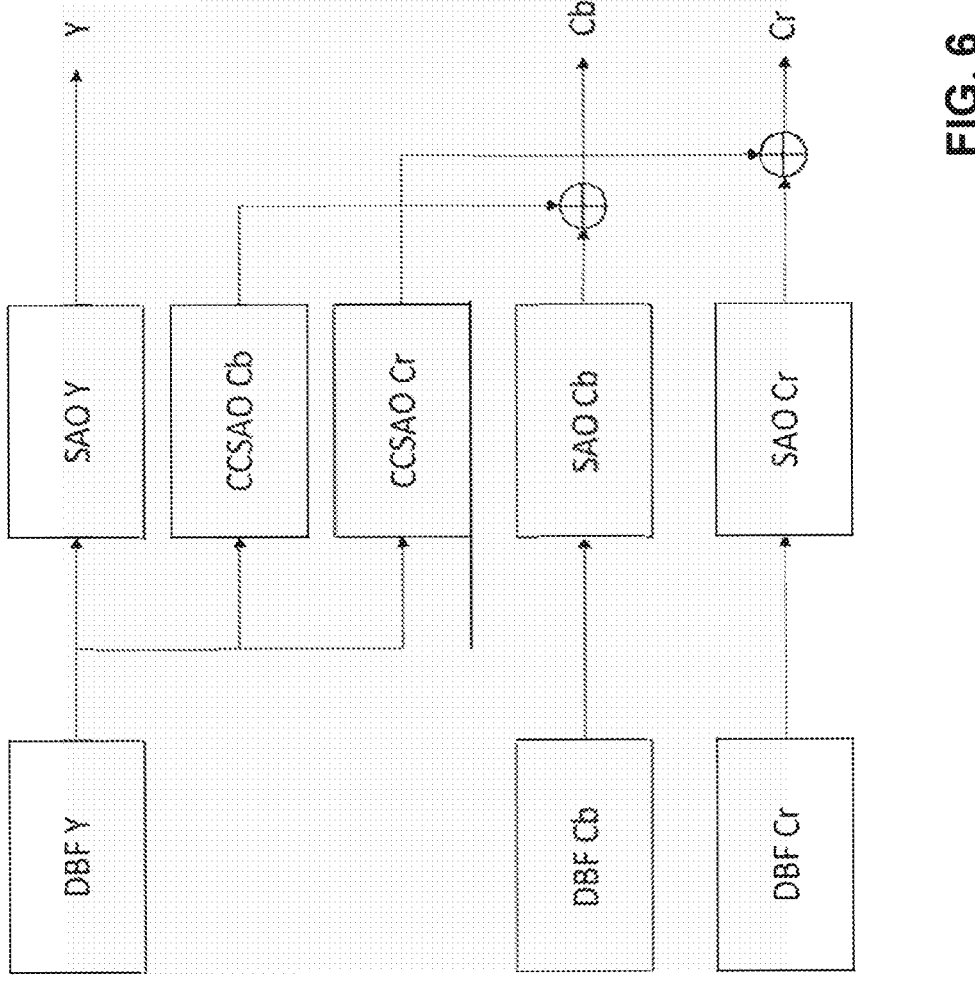

FIG. 6 is a block diagram illustrating the system and process of CCSAO according to some implementations of the present disclosure. The luma samples after luma deblocking filter (DBF Y) is used to determine additional offset for chroma Cb and Cr after SAO Cb and SAO Cr. For example, the current chroma sample 602 is first classified using collocated 604 and neighboring (white) luma samples 606, and the corresponding CCSAO offset value is added to the current chroma sample.

In some embodiments, the current chroma sample classification is reusing the SAO type (EO or BO), class, and category of the collocated luma sample. The corresponding CCSAO offset can be signaled or derived from the decoder itself. For example, let h_Y be the collocated luma SAO offset, h_Cb and h_Cr be the CCSAO Cb and Cr offset, respectively. h_Cb (or h_Cr)=w*h_Y where w can be selected in a limited table. For example, +−¼, +−½, 0, +−1, +−2, +−4 . . . etc., where |w| only includes the power-of-2 values.

In some embodiments, the comparison score [−8, 8] of the collocated luma samples (Y0) and neighboring 8 luma samples are used, which yields 17 classes in total.

```
Initial Class = 0
Loop over neighboring 8 luma samples (Yi, i = 1 to 8)
    if          Y0 > Yi          Class += 1
    else if     Y0 < Yi          Class −= 1
```

In some embodiments, the abovementioned classification methods can be combined. For example, comparison score combined with SAO BO (32 bands classification) is used to increase diversity, which yields 17*32 classes in total. In some embodiments, the Cb and Cr can use the same class to reduce the complexity or saving bits.

Figure 7:
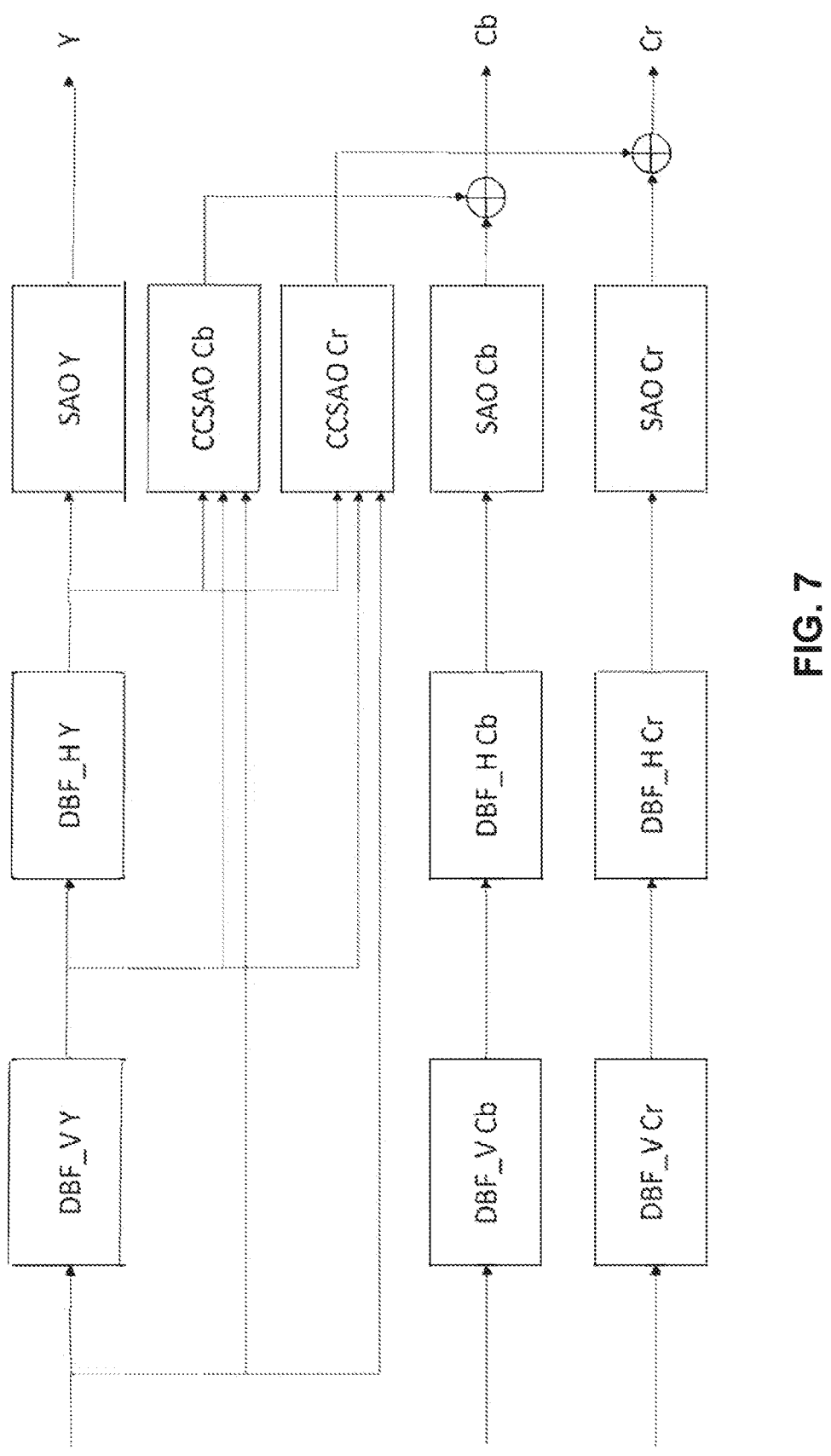
FIG. 7 is a block diagram illustrating a sample process using CCSAO in accordance with some implementations of the present disclosure.

FIG. 7 is a block diagram illustrating a sample process using CCSAO in accordance with some implementations of the present disclosure. Specifically, FIG. 7 shows the input of CCSAO can introduce the input of vertical and horizontal DBF, to simplify the class determination, or increase flexibility. For example, let Y0_DBF_V, Y0_DBF_H, and Y0 be collocated luma samples at the input of DBF_V, DBF_H, and SAO, respectively. Yi_DBF_V, Yi_DBF_H, and Yi are neighbouring 8 luma samples at the input of DBF_V, DBF_H, and SAO, respectively, where i=1 to 8.

$$\text{Max } Y0 = \max (Y0\_DBF\_V, Y0\_DBF\_H, Y0\_DBF)$$

$$\text{Max } Yi = \max (Yi\_DBF\_V, Yi\_DBF\_H, Yi\_DBF)$$

And feed max Y0 and max Yi to CCSAO classification.

Figure 8:
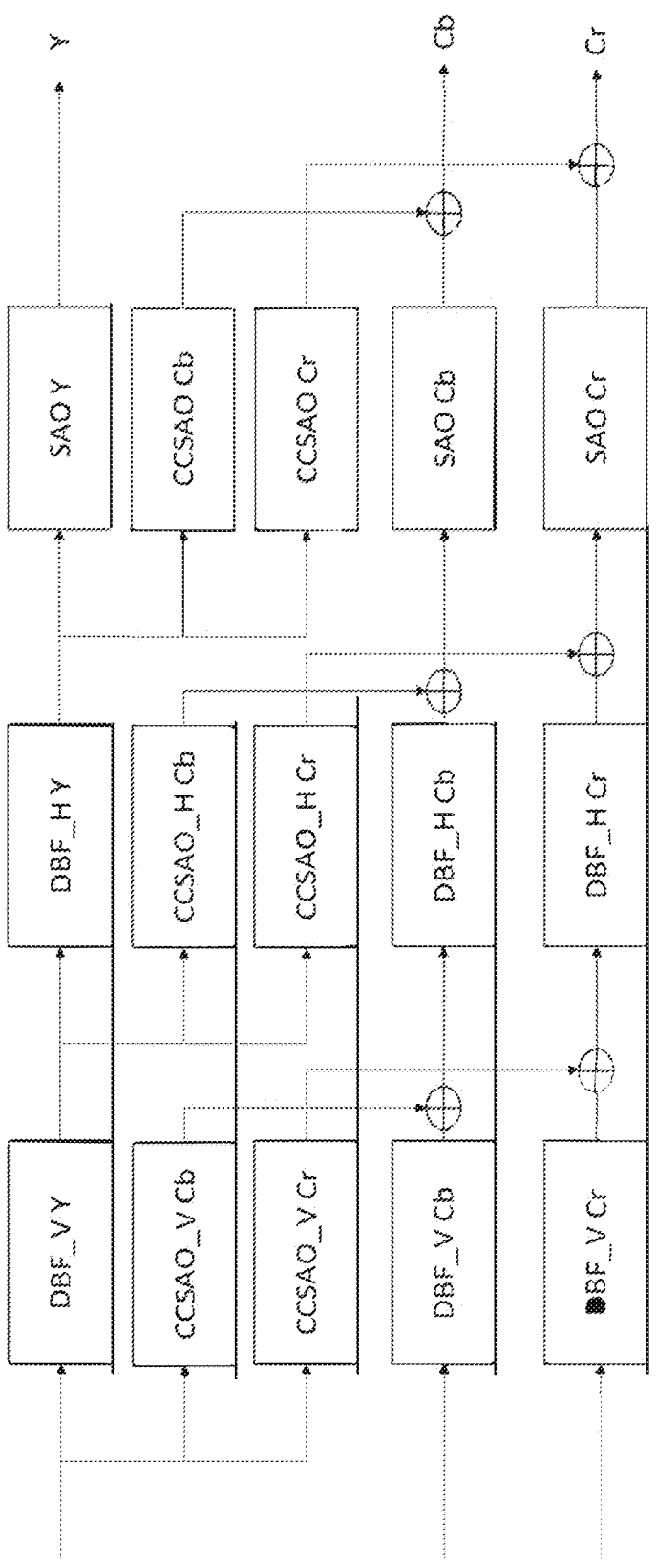
FIG. 8 is a block diagram illustrating that CCSAO process is interleaved to vertical and horizontal deblocking filter (DBF) in accordance with some implementations of the present disclosure.

FIG. 8 is a block diagram illustrating that CCSAO process is interleaved to vertical and horizontal DBF in accordance with some implementations of the present disclosure. In some embodiments, CCSAO blocks in FIGS. 6, 7 and 8 can be selective. For example, using Y0_DBF_V and Yi_DBF_V for the first CCSAO_V, which applies the same sample processing as in FIG. 6, while using the input of DBF_V luma samples as CCSAO input.

In some embodiments, CCSAO syntax is implement as shown in Table 2 below.

TABLE 2

An example of CCSAO syntax

| Level | Syntax element | Meaning |
|-------|----------------|---------|
| SPS | cc_sao_enabled_flag | whether CCSAO is enabled in the sequence |
| SH | slice_cc_sao_cb_flag slice_cc_sao_cr_flag | whether CCSAO is enabled for Cb or Cr |
| CTU | cc_sao_merge_left_flag cc_sao_merge_up_flag | whether CCSAO offset is merged from the left or up CTU |
| CTU | cc_sao_class_idx | CCSAO class index of this CTU |
| CTU | cc_sao_offset_sign_flag cc_sao_offset_abs | CCSAO Cb and Cr offset values of this CTU class |

In some embodiments, for signaling CCSAO Cb and Cr offset values, if one additional chroma offset is signaled, the other chroma component offset can be derived by plus or minus sign, or weighting to save bits overhead. For example, let h_Cb and h_Cr be the offset of CCSAO Cb and Cr, respectively. With explicit signaling w, wherein w=+−|w| with limited |w| candidates, h_Cr can be derived from h_Cb without explicit signaling h_Cr itself.

$$h\_Cr = w * h\_Cb$$

FIG. 9 is a flowchart illustrating an exemplary process 900 of decoding video signal using Cross-component Correlation in accordance with some implementations of the present disclosure.

The video decoder 30, receives the video signal that includes a first component and a second component (910). In some embodiments, the first component is a luma component, and the second component is a chroma component of the video signal.

The video decoder 30 also receives a plurality of offsets associated with the second component (920).

The video decoder 30 then utilizes a characteristic measurement of the first component to obtain a classification category associated with the second component (930). For example, in FIG. 6, the current chroma sample 602 is first classified using collocated 604 and neighboring (white) luma samples 606, and the corresponding CCSAO offset value is added to the current chroma sample.

The video decoder 30 further selects a first offset from the plurality of offsets for the second component according to the classification category (940).

The video decoder 30 additionally modifies the second component based on the selected first offset (950).

In some embodiments, utilizing the characteristic measurement of the first component to obtain the classification category associated with the second component (930) includes: utilizing a respective sample of the first component to obtain a respective classification category of a respective each sample of the second component, wherein the respective sample of the first component is a respective collocated sample of the first component to the respective each sample of the second component. For example, the current chroma sample classification is reusing the SAO type (EO or BO), class, and category of the collocated luma sample.

In some embodiments, utilizing the characteristic measurement of the first component to obtain the classification category associated with the second component (930) includes: utilizing a respective sample of the first component to obtain a respective classification category of a respective each sample of the second component, wherein the respective sample of the first component is reconstructed before being deblocked or is reconstructed after being deblocked. In some embodiment, the first component is being deblocked at a deblocking filter (DBF). In some embodiment, the first component is being deblocked at a luma deblocking filter (DBF Y). For example, alternative to FIG. 6 or 7, the CCSAO input can also be before DBF Y.

In some embodiments, the characteristic measurement is derived by dividing the range of sample values of the first component into several bands and selecting a band based on the intensity value of a sample in the first component. In some embodiments, the characteristic measurement is derived from Band Offset (BO).

In some embodiments, the characteristic measurement is derived based on the direction and strength of the edge information of a sample in the first component. In some embodiments, the characteristic measurement is derived from Edge Offset (EO).

In some embodiments, modifying the second component (950) comprises directly adding the selected first offset to the second component. For example, the corresponding CCSAO offset value is added to the current chroma component sample.

In some embodiments, modifying the second component (950) comprises mapping the selected first offset to a second offset and adding the mapped second offset to the second component. For example, for signaling CCSAO Cb and Cr offset values, if one additional chroma offset is signaled, the other chroma component offset can be derived by using a plus or minus sign, or weighting to save bits overhead.

In some embodiments, receiving the video signal (910) comprises receiving a syntax element that indicates whether the method of decoding video signal using CCSAO is enabled for the video signal in the Sequence Parameter Set (SPS). In some embodiments, cc_sao_enabled_flag indicates whether CCSAO is enabled in the sequence level.

In some embodiments, receiving the video signal (910) comprises receiving a syntax element that indicates whether the method of decoding video signal using CCSAO is enabled for the second component on the slice level. In some embodiments, slice_cc_sao_cb_flag or slice_cc_sao_cr_flag indicates whether CCSAO is enabled in the respective slice for Cb or Cr.

In some embodiments, receiving the plurality of offsets associated with the second component (920) comprises receiving different offsets for different Coding Tree Units (CTUs). In some embodiments, for a CTU, cc_sao_offset_sign_flag indicates a sign for an offset, and cc_sao_offset_abs indicates the CCSAO Cb and Cr offset values of the current CTU.

In some embodiments, receiving the plurality of offsets associated with the second component (920) comprises receiving a syntax element that indicates whether the received offsets of a CTU are the same as that of one of a neighboring CTU of the CTU, wherein the neighboring CTU is either a left or a top neighboring CTU. For example, cc_sao_merge_up_flag indicates whether CCSAO offset is merged from the left or up CTU.

In some embodiments, the video signal further includes a third component and the method of decoding the video signal using CCSAO further includes: receiving a second plurality of offsets associated with a third component; utilizing the characteristic measurement of the first component to obtain a second classification category associated with the third component; selecting a third offset from the second plurality of offsets for the third component according to the second classification category; and modifying the third component based on the selected third offset.

Further embodiments also include various subsets of the above embodiments combined or otherwise re-arranged in various other embodiments.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of encoding video signal, comprising:
    determining a plurality of offsets associated with a first component of a plurality of color components included in the video signal;

utilizing a characteristic measurement of a second component of the plurality of color components to obtain a classification category associated with the first component;

selecting a first offset from the plurality of offsets for the first component according to the classification category;

obtaining a modified sample value of the first component based on the selected first offset; and signaling the plurality of offsets associated with the first component.

2. The method of claim 1, wherein the second component is a luma component, and the first component is a chroma component.

3. The method of claim 1, wherein utilizing the characteristic measurement of the second component to obtain the classification category associated with the first component comprises:

utilizing a respective sample of the second component to obtain a respective classification category of a respective each sample of the first component, wherein the respective sample of the second component is a respective collocated sample of the second component to the respective each sample of the first component.

4. The method of claim 1, wherein utilizing the characteristic measurement of the second component to obtain the classification category associated with the first component comprises:

utilizing a respective sample of the second component to obtain a respective classification category of a respective each sample of the first component, wherein the respective sample of the second component is a reconstructed sample after being deblocked.

5. The method of claim 1, wherein the characteristic measurement is determined by selecting a band from multiple bands based on a value of a sample in the second component, wherein each of the multiple bands comprises a range of sample values of the second component.

6. The method of claim 1, wherein the characteristic measurement is determined based on direction and strength of edge information of a sample in the second component.

7. The method of claim 1, wherein obtaining the modified sample value of the first component comprises directly adding the selected first offset to a reconstructed sample value of the first component on which a deblocking process and a Sample Adaptive Offset (SAO) process are performed.

8. The method of claim 1, further comprising: signaling a syntax element that indicates whether Cross-Component Sample Adaptive Offset (CCSAO) is enabled for the video signal in a Sequence Parameter Set.

9. The method of claim 1, further comprising: signaling a syntax element that indicates whether Cross-Component Sample Adaptive Offset (CCSAO) is enabled for the second component on a slice level.

10. The method of claim 1, wherein the video signal further comprises a third component and the method of encoding the video signal further comprises:

determining a second plurality of offsets associated with a third component;

utilizing a second characteristic measurement of the second component to obtain a second classification category associated with the third component;

selecting a third offset from the second plurality of offsets for the third component according to the second classification category; and obtaining a modified sample value of the third component based on the selected third offset.

11. An electronic apparatus comprising:

one or more processing units;

memory coupled to the one or more processing units; and a plurality of programs stored in the memory that, when executed by the one or more processing units, cause the electronic apparatus to perform acts comprising:

determining a plurality of offsets associated with a first component of a plurality of color components included in the video signal;

utilizing a characteristic measurement of a second component of the plurality of color components to obtain a classification category associated with the first component;

selecting a first offset from the plurality of offsets for the first component according to the classification category;

obtaining a modified sample value of the first component based on the selected first offset; and signaling the plurality of offsets associated with the first component.

12. The electronic apparatus of claim 11, wherein the second component is a luma component, and the first component is a chroma component.

13. The electronic apparatus of claim 11, wherein utilizing the characteristic measurement of the second component to obtain the classification category associated with the first component comprises:

utilizing a respective sample of the second component to obtain a respective classification category of a respective each sample of the first component, wherein the respective sample of the second component is a respective collocated sample of the second component to the respective each sample of the first component.

14. The electronic apparatus of claim 11, wherein utilizing the characteristic measurement of the second component to obtain the classification category associated with the first component comprises:

utilizing a respective sample of the second component to obtain a respective classification category of a respective each sample of the first component, wherein the respective sample of the second component is a reconstructed sample after being deblocked.

15. The electronic apparatus of claim 11, wherein the characteristic measurement is determined by selecting a band from multiple bands based on a value of a sample in the second component, wherein each of the multiple bands comprises a range of sample values of the second component.

16. The electronic apparatus of claim 11, wherein the characteristic measurement is determined based on direction and strength of edge information of a sample in the second component.

17. The electronic apparatus of claim 11, wherein obtaining the modified sample value of the first component comprises directly adding the selected first offset to a reconstructed sample value of the first component on which a deblocking process and a Sample Adaptive Offset (SAO) process are performed.

18. The electronic apparatus of claim 11, wherein the plurality of programs stored in the memory that, when executed by the one or more processing units, further cause the electronic apparatus to perform acts comprising: signaling a syntax element that indicates whether Cross-Component Sample Adaptive Offset (CCSAO) is enabled for the video signal in a Sequence Parameter Set.

19. The electronic apparatus of claim 11, wherein the plurality of programs stored in the memory that, when executed by the one or more processing units, further cause the electronic apparatus to perform acts comprising: signaling a syntax element that indicates whether Cross-Component Sample Adaptive Offset (CCSAO) is enabled for the second component on a slice level.

20. A method for storing a bitstream, comprising:
generating a bitstream by performing an encoding method; and
storing the bitstream,
wherein the encoding method comprises:
determining a plurality of offsets associated with a first component of a plurality of color components included in a video signal;
utilizing a characteristic measurement of a second component of the plurality of color components to obtain a classification category associated with the first component;
selecting a first offset from the plurality of offsets for the first component according to the classification category;
obtaining a modified sample value of the first component based on the selected first offset; and
signaling the plurality of offsets associated with the first component.

* * * * *